(12) United States Patent
Lacaze et al.

(10) Patent No.: US 11,656,626 B2
(45) Date of Patent: May 23, 2023

(54) AUTONOMOUS TRUCK LOADING FOR MINING AND CONSTRUCTION APPLICATIONS

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: ROBOTIC RESEARCH OPCO, LLC, Clarksburg, MD (US)

( * ) Notice: Subject to any disclaimer, the term of this patent is extended or adjusted under 35 U.S.C. 154(b) by 107 days.

(21) Appl. No.: 16/676,544

(22) Filed: Nov. 7, 2019

(65) Prior Publication Data

US 2020/0180924 A1     Jun. 11, 2020

Related U.S. Application Data

(60) Provisional application No. 62/759,963, filed on Nov. 12, 2018.

(51) Int. Cl.
| | | |
|---|---|---|
| *G05D 1/02* | (2020.01) |
| *B66F 9/06* | (2006.01) |
| *B66F 9/075* | (2006.01) |
| *B60W 60/00* | (2020.01) |

(Continued)

(52) U.S. Cl.
CPC ....... *G05D 1/0219* (2013.01); *B60W 60/0011* (2020.02); *B60W 60/0027* (2020.02); *B66F 9/063* (2013.01); *B66F 9/0755* (2013.01); *G05D 1/0212* (2013.01); *G05D 1/0251* (2013.01); *E02F 9/261* (2013.01); *E21F 5/02* (2013.01);

(Continued)

(58) Field of Classification Search
None
See application file for complete search history.

(56) References Cited

U.S. PATENT DOCUMENTS

| | | | |
|---|---|---|---|
| 5,555,503 A | 9/1996 | Kyrtsos et al. | |
| 6,044,312 A * | 3/2000 | Sudo .................... | E02F 9/2045 701/410 |
| 6,341,372 B1 | 1/2002 | Datig | |

(Continued)

FOREIGN PATENT DOCUMENTS

| | | | | |
|---|---|---|---|---|
| CN | 106627456 A | 5/2017 | | |
| JP | 08263138 A * | 10/1996 | ............. | E02F 9/205 |
| WO | 2017180430 A1 | 10/2017 | | |

OTHER PUBLICATIONS

Office Action, dated Apr. 28, 2021, in U.S. Appl. No. 16/445,751. (21 pages).

(Continued)

*Primary Examiner* — Dale W Hilgendorf
(74) *Attorney, Agent, or Firm* — RowanTree Law Group, PLLC; Frederick F. Rosenberger

(57) ABSTRACT

The present invention encodes this knowledge into a database of preferred loading conditions and creates a set of automated maneuvers that accomplish the loading actions. The invention assumes that the truck has a drive-by-wire kit and that it is capable of moving under computer control. This invention provides a set of tools that allows for the automation of the loading process. The invention is relevant to situations where the truck is autonomous and the excavator is not, or when both are automated.

18 Claims, 5 Drawing Sheets

(51) Int. Cl.
*E21F 5/02* (2006.01)
*E02F 9/26* (2006.01)

(52) U.S. Cl.
CPC ... *G05D 1/0257* (2013.01); *G05D 2201/0202* (2013.01)

(56) References Cited

U.S. PATENT DOCUMENTS

| | | | | |
|---|---|---|---|---|
| 9,383,754 | B2* | 7/2016 | Takeda | G06Q 50/02 |
| 9,925,662 | B1 | 3/2018 | Jules et al. | |
| 10,048,692 | B2* | 8/2018 | Hamada | E02F 9/205 |
| 10,071,893 | B2 | 9/2018 | High et al. | |
| 10,802,503 | B2* | 10/2020 | Minagawa | G05D 1/0044 |
| 2004/0158355 | A1* | 8/2004 | Holmqvist | G05D 1/0236 |
| | | | | 701/23 |
| 2008/0021632 | A1 | 1/2008 | Amano | |
| 2009/0076674 | A1* | 3/2009 | Kiegerl | E02F 9/264 |
| | | | | 701/2 |
| 2011/0029238 | A1 | 2/2011 | Lee et al. | |
| 2012/0092486 | A1 | 4/2012 | McDaniel et al. | |
| 2012/0136509 | A1* | 5/2012 | Everett | E02F 9/2045 |
| | | | | 701/2 |
| 2012/0136524 | A1* | 5/2012 | Everett | E02F 9/2054 |
| | | | | 701/24 |
| 2013/0173109 | A1* | 7/2013 | Hukkeri | E02F 9/264 |
| | | | | 701/23 |
| 2013/0261870 | A1 | 10/2013 | Halder et al. | |
| 2013/0325208 | A1* | 12/2013 | Osagawa | G05D 1/0212 |
| | | | | 701/25 |
| 2014/0309841 | A1 | 10/2014 | Hara et al. | |
| 2014/0371947 | A1 | 12/2014 | Stratton et al. | |
| 2015/0057871 | A1 | 2/2015 | Ono et al. | |
| 2015/0285650 | A1* | 10/2015 | Lewis | G01C 21/3407 |
| | | | | 701/428 |
| 2016/0040397 | A1* | 2/2016 | Kontz | G05D 1/0212 |
| | | | | 701/400 |
| 2016/0271795 | A1 | 9/2016 | Vicenti | |
| 2016/0314224 | A1* | 10/2016 | Wei | G06F 30/20 |
| 2016/0349754 | A1 | 12/2016 | Mohr et al. | |
| 2016/0379152 | A1 | 12/2016 | Rodoni | |
| 2017/0247033 | A1* | 8/2017 | Vandapel | B60W 30/0956 |
| 2017/0253237 | A1 | 9/2017 | Diessner | |
| 2017/0285655 | A1* | 10/2017 | Katou | G09B 29/007 |
| 2017/0314955 | A1 | 11/2017 | Lynn | |
| 2017/0315515 | A1* | 11/2017 | Vandapel | G05B 13/0265 |
| 2018/0004224 | A1 | 1/2018 | Arndt et al. | |
| 2018/0016124 | A1* | 1/2018 | Keller | G05D 1/024 |
| 2018/0044888 | A1* | 2/2018 | Chi | G06F 16/2455 |
| 2019/0033877 | A1* | 1/2019 | Wei | E02F 9/205 |
| 2019/0072953 | A1 | 3/2019 | Maheshwari et al. | |
| 2019/0073762 | A1 | 3/2019 | Kean | |
| 2019/0113919 | A1* | 4/2019 | England | G05D 1/024 |
| 2019/0212745 | A1 | 7/2019 | Wendt et al. | |
| 2019/0279508 | A1* | 9/2019 | Wang | G01S 19/42 |
| 2019/0286148 | A1 | 9/2019 | Hase et al. | |
| 2019/0302794 | A1* | 10/2019 | Kean | G05D 1/0214 |
| 2020/0033847 | A1 | 1/2020 | Way et al. | |
| 2020/0050192 | A1 | 2/2020 | O'Donnell et al. | |
| 2020/0117201 | A1 | 4/2020 | Oetken et al. | |
| 2020/0150656 | A1 | 5/2020 | Lacaze et al. | |
| 2020/0150668 | A1 | 5/2020 | Lacaze et al. | |
| 2020/0150687 | A1* | 5/2020 | Halder | G05D 1/0088 |
| 2020/0174486 | A1* | 6/2020 | Luo | B60W 60/0011 |
| 2020/0225675 | A1 | 7/2020 | Lacaze et al. | |
| 2020/0344622 | A1 | 10/2020 | Campbell, Jr. et al. | |
| 2020/0362541 | A1 | 11/2020 | Takaoka | |
| 2020/0384987 | A1 | 12/2020 | Preissler | |
| 2020/0394813 | A1* | 12/2020 | Theverapperuma | E02F 3/437 |
| 2020/0401134 | A1 | 12/2020 | Lacaze et al. | |
| 2021/0064050 | A1* | 3/2021 | Pickett | G05D 1/0278 |
| 2021/0124359 | A1* | 4/2021 | Wei | G05D 1/0217 |
| 2021/0141372 | A1 | 5/2021 | Lacaze et al. | |
| 2022/0253062 | A1* | 8/2022 | Gan | B60L 15/20 |
| 2022/0356674 | A1* | 11/2022 | Norfleet | G05D 1/0217 |

OTHER PUBLICATIONS

Office Action, dated Jul. 19, 2021, in U.S. Appl. No. 16/676,666. (23 pages).
Office Action, dated Jul. 23, 2021, in U.S. Appl. No. 16/679,376. (25 pages).
Office Action, dated Jun. 24, 2021, in U.S. Appl. No. 16/601,775. (30 pages).
Office Action, dated Sep. 16, 2021, in U.S. Appl. No. 16/679,512. (9 pages).

* cited by examiner

AUTONOMOUS TRUCK LOADING FOR MINING AND CONSTRUCTION APPLICATIONS

CROSS-REFERENCE TO RELATED PATENT APPLICATIONS

This application claims priority from U.S. Patent Application Ser. No. 62/759,963, entitled "Autonomous Trucks for Mining and Construction Applications", filed on 12 Nov. 2018. The benefit under 35 USC § 119(e) of the United States provisional application is hereby claimed, and the aforementioned application is hereby incorporated herein by reference.

STATEMENT REGARDING FEDERAL SPONSORSHIP

No part of this invention was a result of any federally sponsored research.

TECHNICAL FIELD OF THE INVENTION

The present invention relates in general to autonomous systems, and, more specifically, to autonomous truck loading for mining and construction applications.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

A number of autonomous trucks are being developed for the mining and construction industries. Much of the automation on these trucks concentrates on the excavators, and on the autonomous driving of the trucks; however, as of now, not much autonomous function exists for loading the trucks.

Trucks in a mine generally move dirt, ore, and other matter from one location to another. The ore is usually loaded by an excavator or a loader. In manned vehicles, there is a sequence of coordinated maneuvers as part of the loading process. These coordinated maneuvers include tasks that are performed with the truck, and tasks that are performed solely with the attached excavator or loader. Currently, the humans performing the tasks have a relatively small amount of sensors helping them, but there are also many techniques that the loading operator uses intuitively:

- The loader may distribute the load differently if the truck has to climb or descend on the route;
- The loader may load less amount if the terrain is challenging for the driver;
- In cases where the truck has multiple trailers, the loader may load the trailers differently;
- The loader may load the truck differently, depending on the truck type;
- The loader may load the truck differently depending on the bay in the truck: i.e., hopper vs. u-section body vs. rock reinforced body;
- The loader may first place large rocks in specific areas, and smaller rocks in adjacent areas, to "lock in" the larger rocks;
- The loader may load the truck differently if the load is wet, or if the load is a slurry;
- The loader may load the truck differently if the truck is a side dump, back dump, or bottom dump truck.

On the loader side, the loading procedure is also significantly affected by the machinery being used. For example, an excavator will follow a different procedure than a front-end loader, and a feeder may require significantly different maneuvers.

For each of these alternatives, there are slightly different loading techniques that are used, both by the truck driver and by the loader. All these peculiarities of the problem are learned with experience and (to a certain degree) with some trial and error on the job. In order to automate the process, this knowledge needs to be explicitly encoded as part of the automation process.

The present invention encodes this knowledge into a database of preferred loading conditions and creates a set of automated maneuvers that accomplish the loading actions. The invention assumes that the truck has a drive-by-wire kit and that it is capable of moving under computer control.

This invention provides a set of tools that allows for the automation of the loading process. The invention is relevant to situations where the truck is autonomous and the excavator is not, or when both are automated.

BRIEF SUMMARY OF THE INVENTION

To minimize the limitations in the prior art, and to minimize other limitations that will be apparent upon reading and understanding the present specification, the present invention describes autonomous truck loading for mining and construction applications.

These and other advantages and features of the present invention are described herein with specificity so as to make the present invention understandable to one of ordinary skill in the art, both with respect to how to practice the present invention and how to make the present invention.

DETAILED DESCRIPTION OF THE INVENTION

Figure 1:
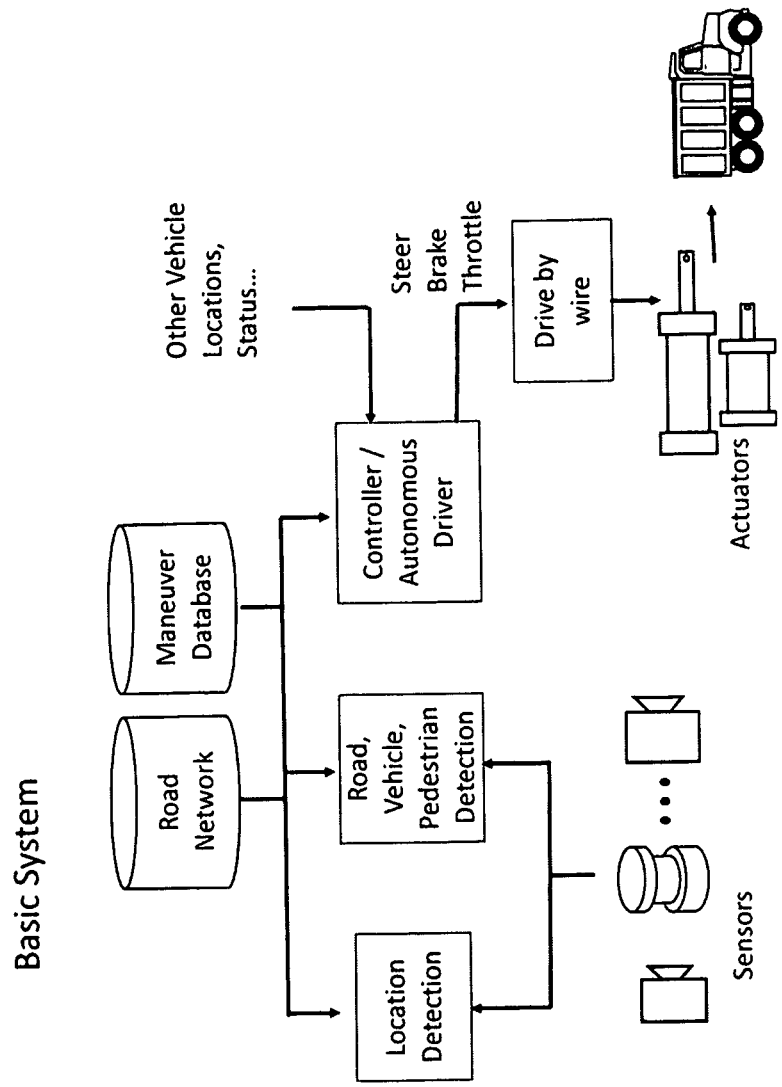
FIG. 1—The use of sensors to detect the location and road, vehicle, pedestrians which are compared to a road network and maneuver database which goes to a controller/autonomous driver which takes into account other vehicle locations and status and is connected to drive by wire which has steer, brake, and throttle, connected with actuators to the truck.

The system is composed of a number of sensors that can be placed both on the loader, on the truck, or in the mining or construction area. By describing the maneuver, we can teach the different automation steps. The process of loading can be divided into three distinct phases: alignment/docking, loading, and departure.

The invention provides a series of tools and behaviors that can be used in each one of these phases. Moreover, the invention has a scripting language that allows for a mining/construction operator to modify and customize the process at each step:

Alignment/Docking Phase. At the beginning of the phase, the truck is likely to be empty, and it must automatically maneuver its hopper or cargo bay into an area that is convenient for the loader to load. Many aspects here are important: the truck must be in a safe pose, the hopper (or at least the area of the bay that the first scoop will be placed) must be within the workspace of the loading system, and usually loaders prefer that the truck be at tangential or normal angles with respect to the loading implement. This alignment simplifies the process of moving the buckets, and minimizes the chances of collisions between the bucket and the truck. The desired alignment and the relative pose between the truck and the loader are inputs to the invention. The invention can automatically generate the trajectories that align/dock the truck to the loading area.

Loading Phase. Depending on the complexity of the operation, the loading may or may not require the truck to move during the process. For example, if the truck has multiple trailers, it will most likely be necessary to load one trailer (or a part of a trailer) and then move the truck to a new position that is within the reach of the workspace of the loader. Once again, the process is significantly different depending on the type of loader used. For example, if the loading is being performed with a bucket loader, the loader may move while the truck remains static throughout the process. However, if the loading is performed with an excavator, it is easier to have the truck move and the excavator to be static. Movement of the truck is coordinated with the movement of the bucket, so that the bucket will not collide with any part of the truck. The invention provides a set of aids and a scripting language that allows a mining or construction operator to design the maneuver. The truck can then perform the maneuver automatically.

Departure Phase. Similar to the alignment phase, the trucks must leave the loading area in a safe manner and without driving over areas that are off limits, or could be dangerous. The invention allows the mining/construction operator to design a maneuver that is suitable for the particular details of the loading area. These maneuvers are instantiated in a scripting language that allows the operator to add/modify/delete these maneuvers.

Depending on the type of mining operation or construction needs, it is not uncommon for the particulars of the loading area to change often. The scripting language has to be sufficiently streamlined where these maneuvers can either be learned, or scripted in a relatively simple way.

Using the invention, the maneuvers in each of the phases above can be driven (or teleoperated) by an operator, and then have the system "replay" that maneuver. The scripting language can use these learned trajectories and concatenate them into new more complex maneuvers.

The scripting language allows the mine operators to assemble and compose new autonomous vehicle behavior. In this particular case, the behavior in focus is the loading of the autonomous truck.

The scripting language in the invention is a graphical user interface, where blocks in the display represent the elementary behavior upon which more complex behavior is built upon.

In particular, the scripting language has behavior blocks, sensing blocks, and logic blocks. Some of the blocks can be learned. For example, the operator may choose to record a trajectory. This trajectory becomes a behavior block. Now, the operator can link two or more of these behaviors to create a more complex behavior. The sensor blocks allow the operator to concatenate behavior until a particular sensor (or combination of sensors) achieve a certain value.

For example, let's say that the mine operator would like to create a new loading behavior. He/she can take a behavior block that encapsulates the motion of the truck to the loading area, then he/she can use the behavior block that positions the middle of the truck perpendicular to the excavator tracks; finally, he/she can use a sensing block and a logic block that forces the truck to stay in that position, until the truck is loaded and the excavator arm is out of the way. Finally, the operator can concatenate another behavior block that has the truck undock and go to the dumping area. The scripting language in the invention is hierarchical, in the sense that more complex behaviors can be encapsulated by using simpler blocks. The preferred embodiment of the invention uses a visual language, as it is simpler to understand by the mining operators; however, other embodiments may have other scripting languages that are not visual, and use text to describe the sequences of actions.

There are three distinct steps on setting up the system:
The mine operator records segments of trajectories that will be used to assemble the loading procedure. These may include positioning the truck at different locations, performing k-turns, and other maneuvers relevant to the three phases of loading presented above.
The mine operator uses these recorded blocks in the scripting language editor to assemble the loading maneuver and to synchronize the operation with the excavator or loader.
The mine operator can use the built-in simulator that simulates the behavior of the script.
The scripts are loaded to the truck, and/or loaded.
The scripts are executed.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims. Note with respect to the materials of construction, it is not desired nor intended to thereby unnecessarily limit the present invention by reason of such disclosure.

The present invention describes the development of a system creating and executing loading behavior between a truck and a loader that is comprised of a truck with a drive-by-wire kit, a database of stored maneuvers that are relevant to the phases of the loading process and a controller that executes a series of maneuvers that place the truck within the workspace of the loader, and moves the truck as to facilitate the process of loading.

A drive-by-wire kit is a complete hardware and software system that allows seamless electronic control of a vehicle's brake, throttle, steering, and shifting to enable testing for autonomous vehicle applications.

This system that has been developed has some or all of the stored maneuvers created by driving the vehicle manually, created by teleoperating the vehicle, or by using a route planner.

There is a scripting language that allows the mining or construction operator to assemble the maneuver from the different behaviors in this system. There is a simulator that allows the operator to verify the script.

A scripting or script language is a programming language for a special run-time environment that automates the execution of tasks; the tasks could alternatively be executed one-by-one by a human operator. Scripting languages are often interpreted.

In this system, the different behaviors account for variation of the truck being used, or the loader being used.

In this system, the behaviors use sensors in the truck and/or leader to verify that the loading process has been completed.

In this system that has been developed, the truck is equipped with weight measuring sensors that can indicate where the maximum load capacity has been reached.

The maneuvers are different depending on the type of load, or wetness of the load. This system is further enhanced with a sensor or sensor located on the loaders, the truck, or in the mining/construction areas (LADAR, stereo pair, cameras, RF beacons, DGPS, acoustic sensors, or RADAR), which provide the autonomous truck with accurate positioning.

Laser Detection and Ranging (LADAR) illuminates a target with pulsed or modulated laser light and then measures the reflected energy with a sensor. Differences in laser return times and wavelengths are then used to generate accurate target representations via high-res 3D shape and detailed vibration spectrum data that is as unique as a fingerprint. This data is then compared to an existing database of similar items, and the precision results are instantly conveyed back to the user. Generally, this technology is also known as Light Imaging, Detection, and Ranging (LIDAR).

Stereo pair refers to a pair of flat perspective images of the same object obtained from different points of view. When a stereopair is viewed in such a way that each eye sees only one of the images, a three-dimensional (stereoscopic) picture giving a sensation of depth is perceived.

In navigation, a radio frequency (RF) beacon is a kind of beacon, a device which marks a fixed location and allows direction finding equipment to find relative bearing. Radio beacons transmit a radio signal which is picked up by radio direction finding systems on ships, aircraft and vehicles to determine the direction to the beacon.

Differential Global Positioning System (DGPS) is an enhancement to the Global Positioning System (GPS) which provides improved location accuracy, in the range of operations of each system, from the 15-meter nominal GPS accuracy to about 1-3 cm in case of the best implementations.

Rayleigh scattering based distributed acoustic sensing (DAS) systems use fiber optic cables to provide distributed strain sensing. In DAS, the optical fiber cable becomes the sensing element and measurements are made, and in part processed, using an attached optoelectronic device. Such a system allows acoustic frequency strain signals to be detected over large distances and in harsh environments.

Radio Detection and Ranging (RADAR) refers to a detection system that uses radio waves to determine the range, angle, or velocity of objects. It can be used to detect aircraft, ships, spacecraft, guided missiles, motor vehicles, weather formations, and terrain.

In this system that has been developed, the sensors are also used to detect humans, vehicles, and other obstacles, and slows down or stops to avoid collisions. The weight of each trailer in the truck is transmitted to the loader. The weight on each wheel in each of the parts of the truck is transmitted to the trailer.

In this system, the leader and the trucks share localization information that is used as part of the scripting language.

In this system that has been developed, multiple loaders are used to speed up the process of loading the autonomous trucks.

FIG. 1 shows a schematic of the overall basic system for the autonomous trucks for mining and construction applications. Here, the sensors detect the location, road, vehicle, and pedestrians and compares the information to those in the database of the road network and the maneuver database and this information is passed along to the controller/autonomous driver. Information about other vehicles, locations, status, and other information is also passed along to the controller/autonomous driver. The controller/autonomous driver is equipped with drive-by-wire which has steer, brake, and throttle which goes to the actuators and leads to the autonomous truck that is used for the construction and mining applications.

Figure 2:
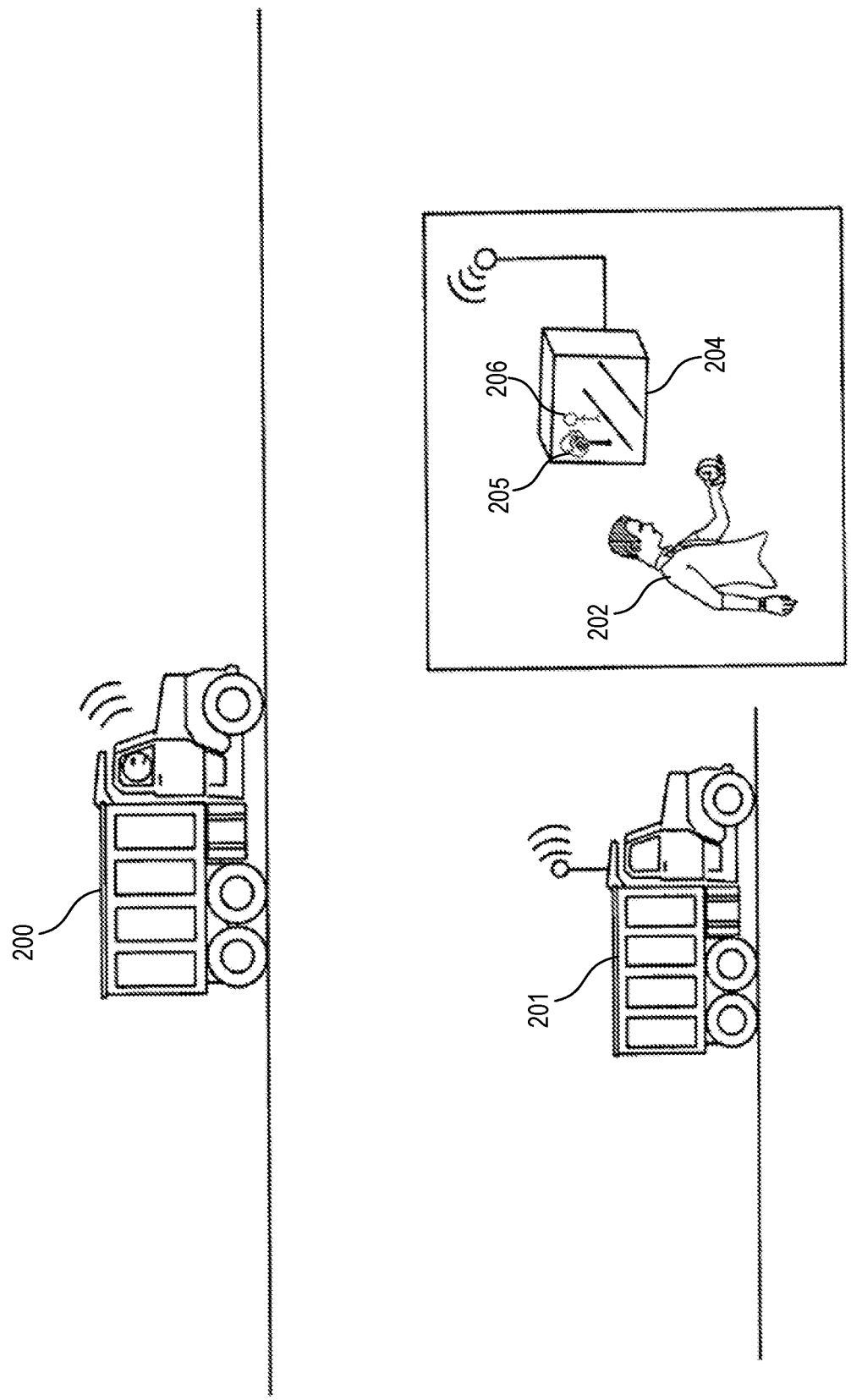
FIG. 2—Paths and locations can be specified by manually driving the vehicle, by remote driving, or by a route planner.

In FIG. 2, it can be seen that the paths and locations can be specified by manually driving the vehicle, by remote driving, or by a route planner. In the top of FIG. 2, it can be seen that the vehicle (200) is manually driven, and in the bottom of the figure, it can be seen that the vehicle (201) is remotely driven by an operator (202). The operator controls the steering wheel on the vehicle (201) on the left based on the view (204) shown containing the tree (205) and the pedestrian (206) standing near the tree (205).

Figure 3:
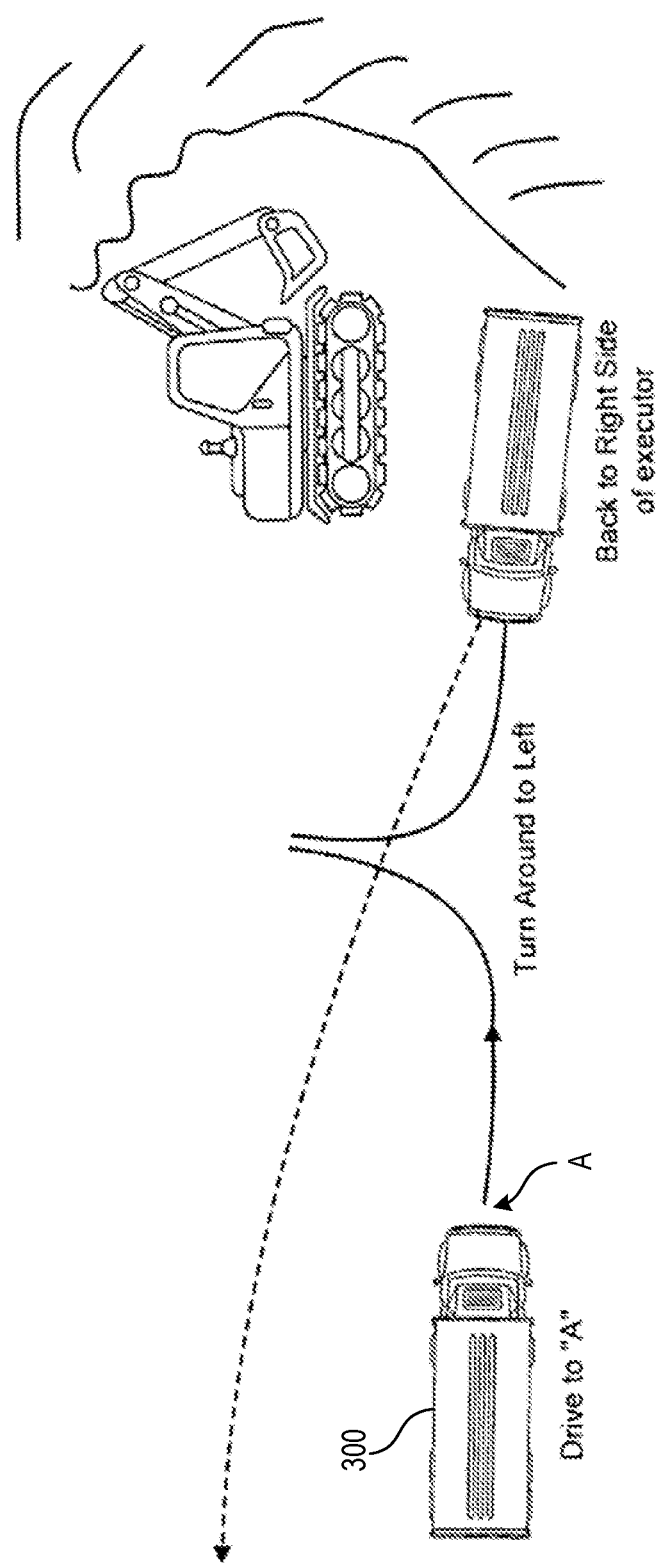
FIG. 3—Shows that as the excavator loads material, the pile will reduce in size. The excavator will have to change position and the "dock" location will change as well.

FIG. 3 shows maneuvers to "dock" location such as the position truck at the right side of the excavator. In the figure, the dashed arrow shows the departure path. As the excavator loads material, the pile will reduce in size. The excavator will have to change position and the "dock" location will change as well. In the figure, the autonomous vehicle (300) on the left drives to point "A" and then turns around to the left side. Then it goes back to the right side of the excavator.

Figure 4:
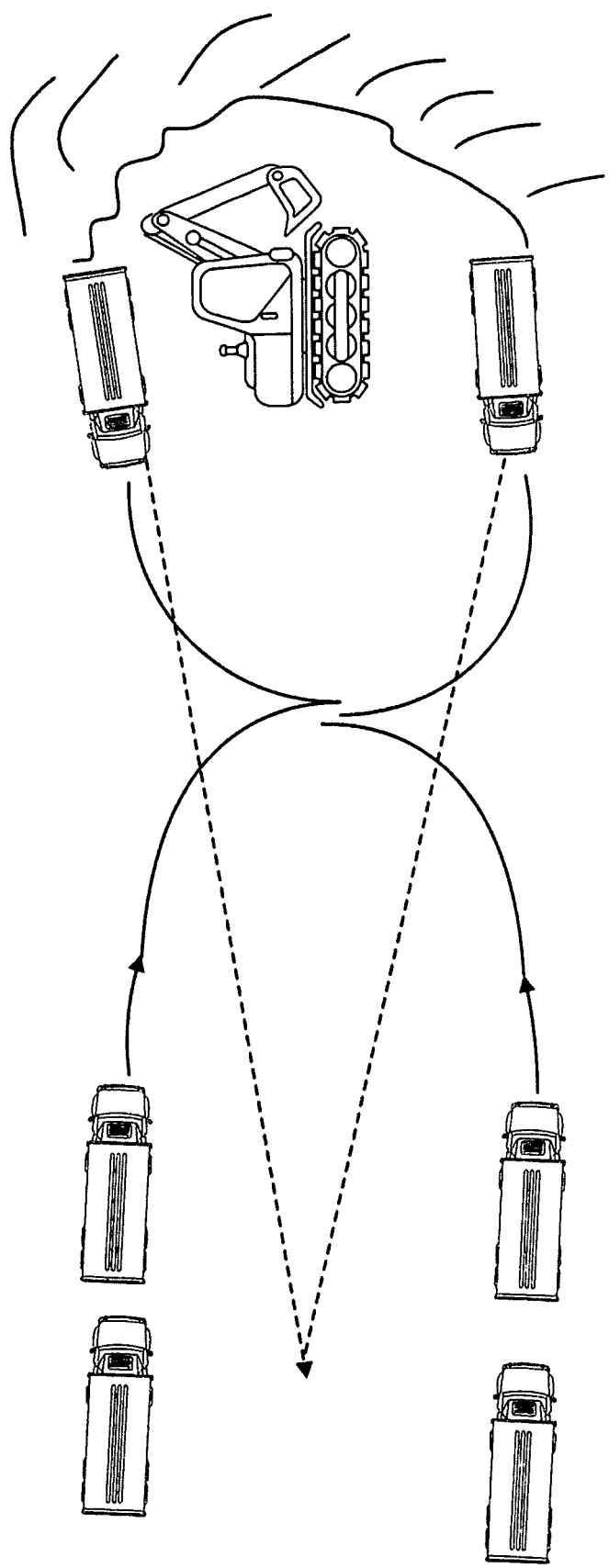
FIG. 4—Multiple trucks can be used with an excavator loading to the left and then to the right.

FIG. 4 shows multiple trucks that can be used with the excavator loading to the left and then to the right. When loading the truck on the left, the full truck on the right leaves and is replaced with an empty truck, keeping the excavator constantly loading. Trucks can wait in different queues for their turn to be loaded or for access to area where they can turn around.

Figure 5:
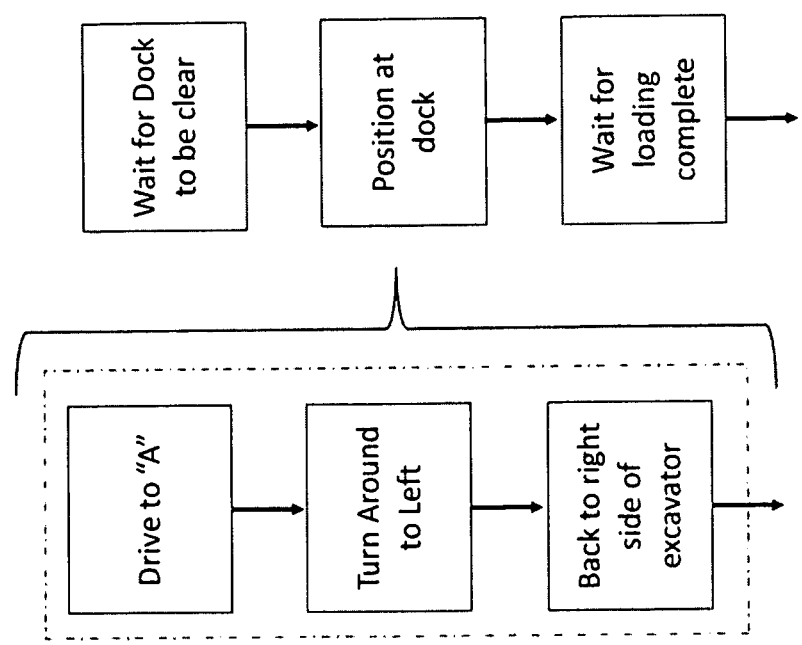
FIG. 5—Scripting language allows various maneuvers to be combined into different behaviors.

FIG. 5 shows that the scripting language allows various maneuvers to be combined into different behaviors. The commands, drive to "A", turn around to left, turn back to right side of excavator is related to waiting for the dock to be clear, positioning at the dock, and waiting for loading to be complete.

The embodiments of the invention in which an exclusive property or privilege is claimed are defined as follows:

1. A system comprising:
   an autonomous truck with a drive-by-wire kit;
   one or more sensors configured to detect features in an environment surrounding the autonomous truck and/or one or more loaders;
   a database storing a plurality of elementary behaviors for various phases of a process of loading the autonomous truck by the one or more loaders, the stored elementary behaviors comprising (i) a plurality of predetermined maneuvers for the autonomous truck, (ii) a plurality of sensing behaviors; and (iii) a plurality of logic behaviors; and a controller operatively coupled to the drive-by-wire kit, the database, and the one or more sensors, wherein the controller is operable to execute stored instructions to:

receive, via a user interface, a selection by an operator of a first one of the stored elementary behaviors from the database;

receive, via the user interface, a selection by the operator of a second one of the stored elementary behaviors from the database;

assemble together at least the first selected elementary behavior and the second selected elementary behavior to form an operation script for loading of the autonomous truck by the one or more loaders; and control, via the drive-by-wire kit, the autonomous truck to perform the operation script for loading, wherein the first selected elementary behavior comprises a sensing behavior that causes the controller to: determine a status of loading or of the surrounding environment, or to detect movement of the autonomous truck and/or the one or more loaders, based on signals from the one or more sensors.

2. The system of claim 1, wherein at least one of the predetermined maneuvers comprises a trajectory recorded during previous manual operation of the autonomous truck.

3. The system of claim 1, wherein the stored elementary maneuvers are classified based on type of load or wetness of the load.

4. The system of claim 1, wherein at least one of the one or more sensors is mounted on the autonomous truck.

5. The system of claim 1, wherein the one or more sensors comprises a laser detection and ranging (LADAR) system, stereo pair, cameras, radio frequency (RF) beacons, a differential global positioning system (DGPS), acoustic sensor, radio detection and ranging (RADAR), or any combination of the foregoing.

6. The system of claim 1, wherein the controller is further operable to execute stored instructions to, during the control of the autonomous truck to perform the operation script:

receive, from the one or more sensors, a signal indicating detection of an obstacle;

determine, in response to the received signal, one or more variations to the operation script that avoids a collision with the detected obstacle, the one or more variations comprising a trajectory deviation, a velocity change, or a stoppage of the autonomous truck; and control, via the drive-by-wire kit, the autonomous truck to perform the operation script with the one or more variations.

7. The system of claim 1, wherein:
the autonomous truck comprises one or more weight measuring sensors;
the controller is operatively coupled to the one or more weight measuring sensors; and
the controller is further operable to execute stored instructions to:

determine, based on signals from the one or more weight measuring sensors, a current weight loaded onto the autonomous truck by the one or more loaders; and send a signal to the one or more loaders indicating the current weight loaded onto the autonomous truck.

8. The system of claim 1, wherein:
the autonomous truck comprises a weight measuring sensor for each wheel;
the controller is operatively coupled to each weight measuring sensor; and
the controller is further operable to execute stored instructions to:

determine, based on one or more signals from each weight measuring sensor, a current distribution of weight loaded onto the autonomous truck by the one or more loaders; and send a signal to the one or more loaders indicating the current distribution of weight loaded onto the autonomous truck.

9. The system of claim 1, wherein at least one of the predetermined maneuvers comprises a predetermined trajectory between two locations.

10. The system of claim 1, wherein the controller is further operable to execute stored instructions to, after assembling the first and second selected elementary behaviors and prior to controlling the autonomous truck to perform the operation script:

simulate performance of the operation script by the autonomous truck; and display, via the user interface, the simulated performance to the operator.

11. The system of claim 1, wherein:
the sensing behavior of the first selected elementary behavior causes the controller to determine the status of loading of the autonomous truck based on signals from the one or more sensors; and
the second selected elementary behavior comprises a logic behavior that causes the controller to maintain a state of the autonomous truck until the controller determines that loading of the autonomous truck is complete.

12. The system of claim 1, wherein at least one of the one or more sensors is mounted on the one or more loaders or disposed in the environment surrounding the autonomous truck and/or the one or more loaders.

13. The system of claim 1, wherein:
the sensing behavior of the first selected elementary behavior causes the controller to determine the status of a loading area based on signals from the one or more sensors; and
the second selected elementary behavior comprises a logic behavior that causes the controller to maintain a location of the autonomous truck outside of the loading area until the loading area is clear.

14. The system of claim 1, wherein:
the sensing behavior of the first selected elementary behavior causes the controller to detect movement of a loading mechanism of the one or more loaders based on signals from the one or more sensors; and
the second selected elementary behavior comprises a maneuver that causes the controller to coordinate movement of the autonomous truck with the detected movement of the loading mechanism.

15. A system comprising:
an autonomous truck with a drive-by-wire kit;
one or more sensors configured to detect features in an environment surrounding the autonomous truck and/or one or more loaders;
a database storing a plurality of elementary behaviors for various phases of a process of loading the autonomous truck by the one or more loaders, the stored elementary behaviors comprising (i) a plurality of predetermined maneuvers for the autonomous truck, (ii) a plurality of sensing behaviors; and (iii) a plurality of logic behaviors; and a controller operatively coupled to the drive-by-wire kit, the database, and the one or more sensors, wherein the controller is operable to execute stored instructions to:

receive, via a user interface, a selection by an operator of a first one of the stored elementary behaviors from the database;

receive, via the user interface, a selection by the operator of a second one of the stored elementary behaviors from the database;

assemble together at least the first selected elementary behavior and the second selected elementary behavior to form an operation script for loading of the autonomous truck by the one or more loaders; and control, via the drive-by-wire kit, the autonomous truck to perform the operation script for loading, and wherein:

the autonomous truck comprises one or more weight measuring sensors;

the controller is operatively coupled to the one or more weight measuring sensors; and the controller is further operable to execute stored instructions to:

determine a weight loaded onto the autonomous truck by the one or more loaders based on signals from the one or more weight measuring sensors;

compare the determined weight to a maximum load capacity of the autonomous truck; and send, in response to the comparison indicating that the maximum load capacity has been reached, a signal to the one or more loaders to stop loading of the autonomous truck.

16. The system of claim 15, wherein at least one of the predetermined maneuvers comprises a trajectory recorded during previous manual operation of the autonomous truck.

17. The system of claim 15, wherein the stored elementary maneuvers are classified based on type of load or wetness of the load.

18. The system of claim 15, wherein the controller is further operable to execute stored instructions to, after assembling the first and second selected elementary behaviors and prior to controlling the autonomous truck to perform the operation script:

simulate performance of the operation script by the autonomous truck; and display, via the user interface, the simulated performance to the operator.

* * * * *